(12) United States Patent
Ressler (10) Patent No.: US 7,386,961 B2
(45) Date of Patent: Jun. 17, 2008

(54) BRACKET, METHOD OF MAKING, AND METHOD OF MOUNTING ROOFTOP ELEMENTS ON ROOFTOP STRUCTURE

(75) Inventor: Stephen Ressler, Wilmington, DE (US)

(73) Assignee: GE Energy (USA) LLC, Atlanta, GA (US)

( * ) Notice: Subject to any disclaimer, the term of this patent is extended or adjusted under 35 U.S.C. 154(b) by 160 days.

(21) Appl. No.: 11/280,458

(22) Filed: Nov. 16, 2005

(65) Prior Publication Data

US 2007/0111581 A1 May 17, 2007

(51) Int. Cl.
*E04B 2/00* (2006.01)

(52) U.S. Cl. .................... 52/506.05; 248/256; 248/300

(58) Field of Classification Search ................ 248/237, 248/300, 200, 225.11; 439/346; 136/244; 52/506.5, 712, 543, 544, 546, 547, 173.3, 52/747.1, 748.1
See application file for complete search history.

(56) References Cited

U.S. PATENT DOCUMENTS 5,653,079 A * 8/1997 Loeffler et al. ............... 52/712
2002/0046536 A1 * 4/2002 Hotta ............................ 52/698
2002/0109059 A1 * 8/2002 Macri et al. ................. 248/237
2004/0051017 A1 * 3/2004 Mislich ....................... 248/237
2006/0059858 A1 * 3/2006 Layman .................... 52/749.12

* cited by examiner

Primary Examiner—Ramon O Ramirez
(74) Attorney, Agent, or Firm—Burr & Brown (57) ABSTRACT

A bracket comprises a mounting base, a landing riser attached to the mounting base, a landing attached to the landing riser, a slot-defining structure riser attached to the mounting base and a slot-defining structure attached to the slot-defining structure riser. A first landing surface of the landing is parallel to at least a portion of a first mounting base surface of the mounting base. A slot is defined between first and second slot-defining surfaces of the slot-defining structure. The first slot-defining surface is parallel to the first landing surface. A method of making a bracket, comprises forming a unitary element and bending the unitary element to produce a bracket. A method of mounting a rooftop element on a rooftop structure comprises attaching at least two brackets to the rooftop structure, and positioning a rooftop element on the brackets. A rooftop array comprises a rooftop structure, a plurality of brackets attached to the rooftop structure and a plurality of rooftop elements.

18 Claims, 7 Drawing Sheets

BRACKET, METHOD OF MAKING, AND METHOD OF MOUNTING ROOFTOP ELEMENTS ON ROOFTOP STRUCTURE

FIELD OF THE INVENTION

The present invention relates to brackets for mounting rooftop elements on rooftop structures, methods of making such brackets, methods of mounting rooftop elements and rooftop arrays comprising a rooftop structure and a plurality of rooftop elements mounted on the rooftop structure using a plurality of brackets. In particular, the present invention relates to brackets for mounting PV modules on rooftops, methods of making such brackets and mounting PV modules on rooftops.

BACKGROUND OF THE INVENTION

Many communities prohibit the mounting of rooftop elements, such as conventional photovoltaic (PV) modules, on a visible roof structure of commercial or residential structures because of what is considered by some to be poor aesthetics of these installations. Additionally, modular systems have been difficult to install securely to roof structures constructed of standard roofing materials and have often resulted in damage to the roofing structure.

In addition, there is an ever-increasing demand for "alternative" energy (i.e., non-fossil fuel energy) sources due to the political ramifications, limitations and environmental concerns associated with existing fossil fuel sources of energy. This demand possibly could be satisfied at least in part by using solar energy as an alternative energy source, except that many communities prohibit the mounting of conventional photovoltaic elements on the front (visible) roofs of small commercial and residential roof structures.

Previously, photovoltaic elements have been deployed in a wide variety of ways, including deployment on the roofs of buildings, including private residential homes. However, such photovoltaic elements have not been capable of being securely mounted onto roof structures constructed of standard roofing materials in an aesthetically pleasing manner, thereby placing a limitation on the usage of photovoltaic elements in a variety of locations where solar energy could otherwise be collected.

BRIEF DESCRIPTION OF THE INVENTION

There is provided a bracket (as well as methods of making such brackets, methods of using such brackets and a rooftop array in which rooftop elements are mounted on such brackets) which is effective for mounting rooftop elements on rooftop structures. In one aspect of the present invention, there is provided a bracket which is very effective for mounting PV modules on rooftops, as described in more detail below.

In a first aspect of the invention, there is provided a bracket comprising a mounting base, a landing, a landing riser, a slot-defining structure and a slot-defining structure riser. In this aspect:

the mounting base comprises a first mounting base surface;

at least a portion of the first mounting base surface is substantially flat and extends substantially in a first plane;

the landing riser is attached to the mounting base;

the landing is attached to the landing riser;

the landing comprises a first landing surface which extends substantially in a second plane;

the second plane is substantially parallel to the first plane;

the slot-defining structure riser is attached to the mounting base;

the slot-defining structure is attached to the slot-defining structure riser;

the slot-defining structure comprises a first slot-defining surface and a second slot-defining surface;

a slot is defined between the first slot-defining surface and the second slot-defining surface;

the first slot-defining surface extends substantially in a third plane;

the third plane is substantially parallel to the first plane; and the second plane and the third plane are each spaced from the first plane.

In a second aspect of the invention, there is provided a method of making a bracket, comprising forming a unitary element and bending the unitary element to produce a bracket as described above.

In a third aspect of the invention, there is provided a method of mounting a rooftop element on a rooftop structure, comprising attaching a plurality of brackets to the rooftop structure, positioning a rooftop element on at least first and second brackets, the first and second brackets each comprising a bracket as described above, and sliding the rooftop element relative to the first and second brackets such that a first flange of the rooftop element slides along the first slot-defining surface of the first bracket and a second flange of the rooftop element slides along the landing of the second bracket, so that the rooftop element reaches a position where the first flange is positioned in the slot between the first slot-defining surface and the second slot-defining surface of the first bracket and the second flange is still in contact with the landing of the second bracket.

In a fourth aspect of the invention, there is provided a rooftop array comprising a rooftop structure, a plurality of brackets attached to the rooftop structure, each of the brackets comprising a bracket as described above and a plurality of rooftop elements, wherein:

each of the rooftop elements is supported by at least two of the brackets, a first of the rooftop elements has at least a first flange and a second flange, the first flange being located in a slot of the first bracket (and on a first slot-defining surface of a first bracket), the second flange being positioned on a landing of a second bracket, a second of the rooftop elements has at least a third flange and a fourth flange, the third flange being positioned in a slot of the second bracket (and on a first slot-defining surface of the second bracket).

The invention may be more fully understood with reference to the accompanying drawings and the following detailed description of the invention.

DETAILED DESCRIPTION OF THE INVENTION

As described above, in a first aspect, there is provided a bracket comprising a mounting base, a landing, a landing riser, a slot-defining structure and a slot-defining structure riser, in which the mounting base comprises a first mounting base surface;

at least a portion of the first mounting base surface is substantially flat and extends substantially in a first plane;

the landing riser is attached to the mounting base;

the landing is attached to the landing riser;

the landing comprises a first landing surface which extends substantially in a second plane;

the second plane is substantially parallel to the first plane;

the slot-defining structure riser is attached to the mounting base;

the slot-defining structure is attached to the slot-defining structure riser;

the slot-defining structure comprises a first slot-defining surface and a second slot-defining surface;

a slot is defined between the first slot-defining surface and the second slot-defining surface;

the first slot-defining surface extends substantially in a third plane;

the third plane is substantially parallel to the first plane; and the second plane and the third plane are each spaced from the first plane.

The following features are optional features which the brackets can exhibit, but the brackets do not necessarily exhibit. Any one of these features, or any combination of two or more of these features, can be provided.

The slot-defining structure can comprise a first slot-defining structure surface and a second slot-defining structure surface, the first slot-defining structure surface extending substantially in a fourth plane, the second slot-defining structure surface extending substantially in a fifth plane, the fifth plane being substantially parallel to the fourth plane.

The slot-defining structure riser can comprise a first slot-defining structure riser surface and a second slot-defining structure riser surface, the first slot-defining structure riser surface extending substantially in the fourth plane, the second slot-defining structure riser surface extending substantially in the fifth plane.

The landing riser can comprise a first landing riser surface and a second landing riser surface, the first landing riser surface extending substantially in the fourth plane, the second landing riser surface extending substantially in the fifth plane. The fifth plane can be substantially parallel to the fourth plane, the fourth plane being substantially perpendicular to the first plane.

The mounting base can comprise a second mounting base surface which extends substantially in a sixth plane, the sixth plane being substantially parallel to the first plane.

The mounting base can have a plurality of mounting holes formed therethrough, the mounting holes each having an opening on the first mounting base surface. The mounting holes can extend through mounting base from the first mounting base surface to the second mounting base surface, and the mounting holes can extend in directions substantially perpendicular to first plane.

A gap can be positioned between at least a portion of the landing riser which is spaced from the mounting base and at least a portion of the slot-defining structure riser which is spaced from the mounting base, the gap extending in a direction which is parallel to a slot-extending direction, the slot-extending direction being a direction in which a major axis of the slot extends.

The slot-defining structure can extend farther in a direction parallel to the slot-extending direction and away from the landing riser than the slot-defining structure riser.

The slot can have an open end and a closed end spaced from each other along the slot-extending direction.

The first slot-defining surface can extend farther in a direction parallel to the slot-extending direction and away from the closed end than the second slot-defining surface.

The bracket can further comprise an overlap structure which comprises a first overlap structure surface, the first overlap structure surface extending substantially in a seventh plane, the seventh plane being substantially parallel to the first plane, the overlap structure comprising an overhang edge, the overhang edge extending substantially in an eighth plane, the eighth plane being substantially perpendicular to the seventh plane.

The landing can further comprise a second landing surface, the second landing surface extending substantially in a ninth plane, the ninth plane being substantially parallel to the second plane.

Figure 1:
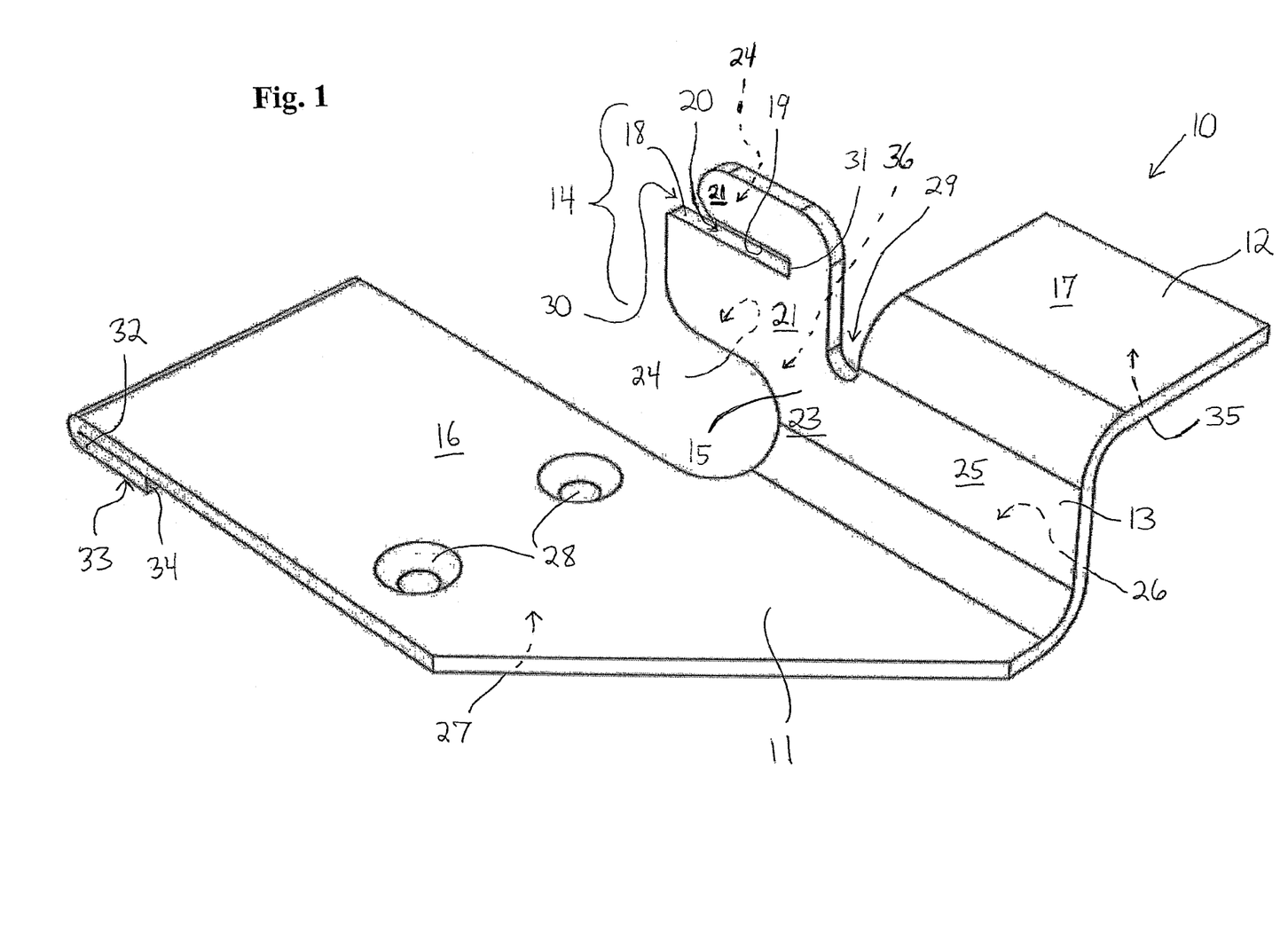
FIG. 1 is a perspective view of an embodiment of a bracket of the present invention.

FIG. 1 is a perspective view of an embodiment of a bracket of the present invention. Referring to FIG. 1, there is shown a bracket 10 which comprises a mounting base 11, a landing 12, a landing riser 13, a slot-defining structure 14 and a slot-defining structure riser 15.

The mounting base 11 comprises a first mounting base surface 16. The first mounting base surface 16 is substantially flat and extends substantially in a first plane.

The landing riser 13 is attached to the mounting base 11, and the landing 12 is attached to the landing riser 13. The landing 12 comprises a first landing surface 17 which extends substantially in a second plane. In this embodiment, the second plane is substantially parallel to the first plane.

The slot-defining structure riser 15 is attached to the mounting base 11, and the slot-defining structure 14 is attached to the slot-defining structure riser 15.

The slot-defining structure 14 comprises a first slot-defining surface 18 and a second slot-defining surface 19. A slot 20 is defined between the first slot-defining surface 18 and the second slot-defining surface 19. The first slot-defining surface 18 extends substantially in a third plane. In this embodiment, the third plane is substantially parallel to the first plane. The second plane and the third plane are each spaced from the first plane.

The slot-defining structure 14 comprises a first slot-defining structure surface 21 and a second slot-defining structure surface 24. The first slot-defining structure surface 21 extends substantially in a fourth plane. The second slot-defining structure surface 24 extends substantially in a fifth plane. In this embodiment, the fifth plane is substantially parallel to the fourth plane. In this embodiment, the fourth plane is substantially perpendicular to the first plane.

The slot-defining structure riser 15 comprises a first slot-defining structure riser surface 23 and a second slot-defining structure riser surface 37. In this embodiment, the first slot-defining structure riser surface 23 extends substantially in the fourth plane. In this embodiment, the second slot-defining structure riser surface 37 extends substantially in the fifth plane.

The landing riser 13 comprises a first landing riser surface 25 and a second landing riser surface 26. In this embodiment, the first landing riser surface 25 extends substantially in the fourth plane. In this embodiment, the second landing riser surface 26 extends substantially in the fifth plane.

The mounting base comprises a second mounting base surface 27 which extends substantially in a sixth plane. In this embodiment, the sixth plane is substantially parallel to the first plane.

The mounting base 11 has a plurality of mounting holes 28 formed therethrough. In this embodiment, the mounting holes 28 each have an opening on the first mounting base surface 16. In this embodiment, the mounting holes 28 extend through mounting base 11 from the first mounting base surface 16 to the second mounting base surface 27, and the mounting holes 28 extend in directions substantially perpendicular to the first plane.

In this embodiment, a major axis of the slot 20 extends in a slot-extending direction, a gap 29 being positioned between at least a portion of the landing riser 13 which is spaced from the mounting base 11 and at least a portion of the slot-defining structure riser 15 which is spaced from the mounting base 11, the gap 29 extending in a direction which is parallel to the slot-extending direction. The slot 20 has an open end 30 and a closed end 31 spaced from each other along the slot-extending direction. In this embodiment, the slot-defining structure 14 extends farther in a direction parallel to the slot-extending direction and away from the landing riser 13 than the slot-defining structure riser 15. In addition, in this embodiment, the first slot-defining surface 18 extends farther in a direction parallel to the slot-extending direction and away from the closed end than the second slot-defining surface 19.

In this embodiment, the bracket further comprises an overlap structure 32 which comprises a first overlap structure surface 33 which extends substantially in a seventh plane. In this embodiment, the seventh plane is substantially parallel to the first plane. The overlap structure comprises an overhang edge 34 which extends substantially in an eighth plane. In this embodiment, the eighth plane is substantially perpendicular to the seventh plane.

The landing 12 further comprises a second landing surface 35 which extends substantially in a ninth plane. In this embodiment, the ninth plane is substantially parallel to the second plane.

As described above, in a second aspect, there is provided a method of making a bracket, comprising forming a unitary element; and bending the unitary element to produce a bracket conforming to the first aspect.

As mentioned above, in a third aspect of the invention, there is provided a method of mounting a rooftop element on a rooftop structure, comprising attaching a plurality of brackets to the rooftop structure, positioning a rooftop element on at least first and second brackets (the first and second brackets each comprising a bracket according to the first aspect of the invention) and sliding the rooftop element relative to the first and second brackets such that a first flange of the rooftop element slides along the first slot-defining surface of the first bracket and a second flange of the rooftop element slides along the landing of the second bracket, so that the rooftop element reaches a position where the first flange is positioned in the slot between the first slot-defining surface and the second slot-defining surface of the first bracket and the second flange is still in contact with the landing of the second bracket.

The following features are optional features which can be included in the method of mounting a rooftop element according to the third aspect of the present invention, but the methods of mounting rooftop elements according to the third aspect of the invention do not necessarily include any of these features. Any one of these features, or any combination of two or more of these features, can be provided.

The rooftop element can comprise a module and a frame member which supports the module and which maintains the module substantially in a desired location and/or orientation relative to the rooftop.

The frame member can comprise structure which engages the module so as to hold the module substantially in position.

The frame member can comprise two flanges, one for engaging one or more slots of one or more brackets according to the first aspect of the invention, and the other for being connected to one or more landings of one or more brackets according to the first aspect of the invention.

The rooftop elements can comprise any desired rooftop element, e.g., a PV module.

In general, the brackets can comprise any suitable material, e.g., any material or materials selected from among metals, ceramics and plastics. The brackets can comprise a material which is the same material that the frame members comprise, in order to avoid galvanic corrosion. In cases where the rooftop elements comprise PV modules, the frame members typically comprise aluminum. In such instances, the brackets can likewise comprise aluminum.

The rooftop structure can be of any shape, e.g., flat or sloping. The rooftop structure can be any suitable rooftop structure, a wide variety of which is well known to those of skill in the art. For example, a typical residential rooftop structure is sloping and comprises a roof deck made of wood and asphalt shingles nailed onto the roof deck.

In one embodiment of a method according to the third aspect of the present invention, a rooftop element which is to be mounted on a sloping rooftop structure using brackets as described herein comprises a module which is generally rectangular in cross-section, having first and second major surfaces which are opposite one another, a first pair of side surfaces which are opposite one another and a second pair of side surfaces which are likewise opposite one another. In this embodiment, a frame member (which can be unitary or which can be provided in any number of pieces) comprises: frame member side portions which extend along each of the side surfaces of the module; frame member top portions connected to the frame member side portions, the frame member top portions covering a portion of the first major surface of the module; frame member bottom portions also connected to the frame member side portions, the frame member bottom portions covering at least the portion of the second major surface of the module; risers connected to respective frame member side portions; and flanges connected to the risers.

Figure 2:
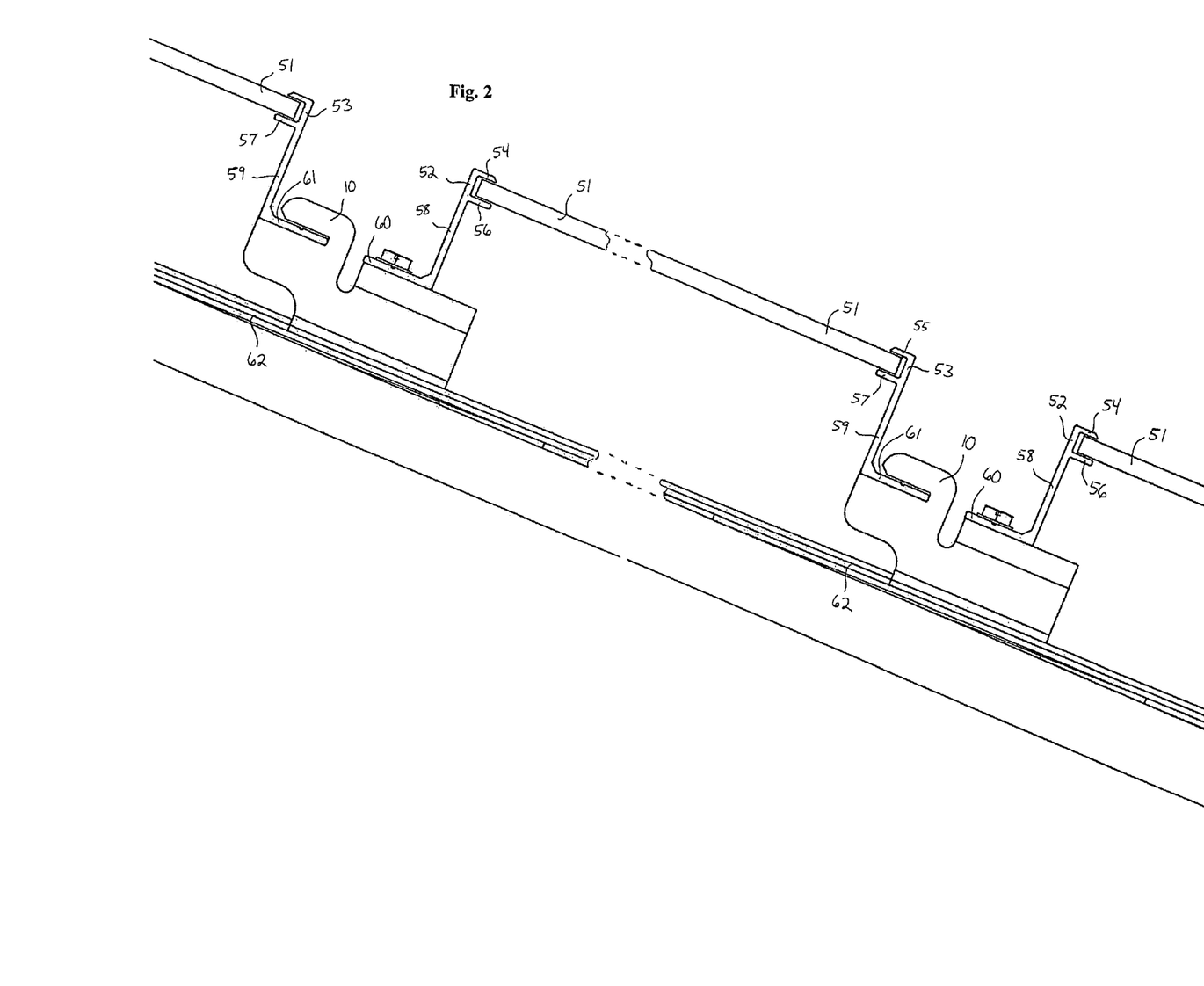
FIG. 2 is a cross-sectional view of an embodiment of rooftop elements mounted on brackets of the present invention, the brackets being attached to a rooftop structure.

FIG. 2 is a cross-sectional view of several rooftop elements according to this embodiment, mounted on brackets according to the first embodiment, the brackets being attached to a rooftop structure. Referring to FIG. 2, there are depicted three modules 51. Only the far right end of one module 51 (i.e., the module which is farthest to the left) is depicted, only the far left end and the far right end of the second module 51 (i.e., the module which is in the middle) is depicted, and only the far left end of the third module 51 (i.e., the module which is farthest to the right) is depicted. Two bracket 10 are depicted, both being mounted on the rooftop structure 62. Frame members are attached to each end of the second module 51. The frame member on the left side of the second module 51 includes a frame member side portion 52, a frame member top portion 54, a frame member bottom portion 56, a rooftop element riser 58 and a flange 60 which is attached to the landing of the left bracket 10. The frame member on the right side of the second module 51 includes a frame member side portion 53, a frame member top portion 55, a frame member bottom portion 57, a rooftop element riser 59 and a flange 61 which is positioned in the slot of the right bracket 10. FIG. 2 also depicts the frame member on the right side of the first module 51 and the frame member on the left side of the third module 51.

According to this embodiment, in order to mount the rooftop element 50 on the sloping rooftop structure, at least four brackets are attached to the rooftop structure, the brackets being carefully positioned such that they are spaced from one another in the same manner that they will be spaced after the rooftop element is mounted on them in the manner discussed below. The brackets can be mounted on the rooftop structure by any suitable attachment device(s), e.g., screws which are passed through mounting holes in the brackets and into the rooftop structure.

The rooftop element is then positioned such that the bottom of the flange 61 is resting on the first slot-defining surfaces of at least two of the brackets (lower brackets) and the bottom surface of the flange 60 is resting on the landings of at least two other brackets (upper brackets) positioned higher on the rooftop structure than the upper brackets. Then, the rooftop element is slid such that the flange 61 slides along the first slot-defining surfaces of the lower brackets into the slot of the lower brackets and (optionally) eventually into contact with the closed ends of the slots, and the flange 60 slides along the landings of the upper brackets during the entire sliding process and remains on the landing at the conclusion of the sliding process. The flange 60 can then optionally be attached to the landings of the upper brackets by any suitable attachment device or devices, such as a self-threading screw.

As mentioned above, in a fourth aspect of the invention, there is provided a rooftop array, comprising a rooftop structure, a plurality of brackets attached to the rooftop structure (each of the brackets comprising a bracket according to the first aspect of the invention) and a plurality of rooftop elements. Each of the rooftop elements is supported by at least two of the brackets. A first of the rooftop elements has at least a first flange and a second flange. The first flange is located in a slot of a first bracket (and is supported on a first slot-defining surface of the first bracket). The second flange is positioned on a landing of a second bracket. A second of the rooftop elements has at least a third flange and a fourth flange. The third flange is positioned in a slot of the second bracket (and is supported on a first slot-defining surface of the second bracket).

As noted above, the rooftop structure can be any suitable rooftop structure, a wide variety of which is well known to those of skill in the art. For example, a typical residential rooftop structure comprises a roof deck made of wood and asphalt shingles nailed onto the roof deck.

The following is a description of an embodiment in which asphalt shingles and brackets according to the first aspect of the invention are attached to a roof deck, and rooftop elements are mounted on the brackets.

Figure 3:
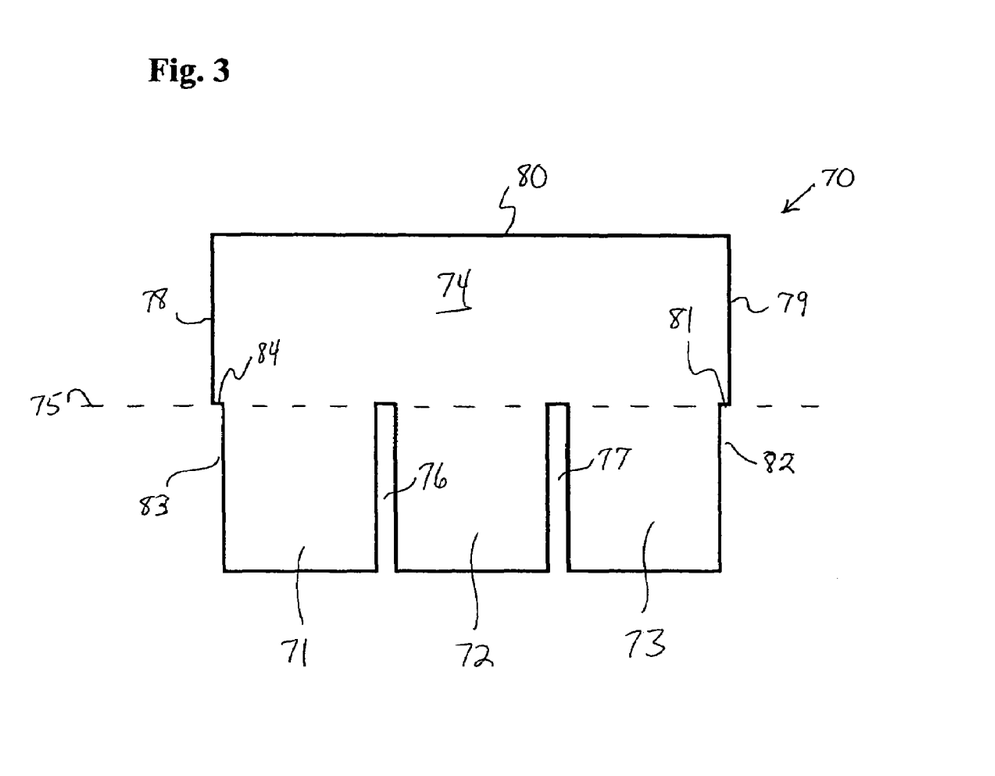
FIG. 3 depicts a representative example of an asphalt shingle.

FIG. 3 depicts a typical asphalt shingle 70, comprising three tabs 71, 72 and 73 and a main portion 74. FIG. 3 shows an imaginary dotted line 75 which conceptually separates the main portion 74 from the tabs 71, 72 and 73. The shingle 70 also comprises intermediate notches 76 and 77, side edges 78 and 79, a top edge 80, and side notches 82 and 83, the side notch 82 having an upper edge 81 and the side notch 83 having an upper edge 84.

According to one example of a well-known technique for applying asphalt shingles like those depicted in FIG. 3 to a roof deck, a starter course of shingles, i.e., a row of shingles extending across the roof deck (i.e., from left to right) is applied to the lower edge of the roof deck, e.g., along the eaves (typically, for the first course of shingles, the tabs are cut off several inches and the shingles are applied upside down, i.e., with the tabs pointing upward toward the apex of the roof). Then, the next course of shingles is attached to the roof deck such that the lower edges of the three tabs 71, 72 and 73 are located about halfway between the imaginary line 75 and the edge 80 of the shingles in the first course. The third course is then applied such that the lower edges of the tabs 71, 72 and 73 are located along the imaginary line 75 of the previous course of shingles. Each subsequent course of shingles is then applied sequentially in a manner analogous to the third course, i.e., such that the lower edges of the tabs are approximately located at the imaginary line 75 of the shingles in the previous course. This procedure is repeated until the apex of the roof is reached, whereupon shingles which do not include tabs are applied such that they overlap the apex substantially along a centerline and extend downward on both sides of the apex. Typically, in such construction, the shingles of each course of shingles are offset laterally by about one-sixth of the width of the shingles relative to the shingles in the previous course of shingles, i.e., by about one-half the width of a tabs plus one of the intermediate notches 76 and 77, i.e., such that the side edges 78 and 79 of the shingles of every six courses of shingles are substantially aligned.

In the present embodiment, the brackets are attached to the roof deck at a time when the sequence of attaching shingles to the roof has proceeded to a point where the bracket can be attached to the roof deck with the roof engagement edge of the bracket abutting against the top edge 80 of a shingle, the bottom of the overlap structure of the bracket being in contact with the roof deck, the bottom of the mounting base being in contact with the shingle and the landing riser and the slot-defining structure riser protruding upward at a location where notches 82 and 83 of adjacent shingles in the next installed course of shingles will be located (that is, the bracket is installed with its roof engagement edge abutting the top edge of a shingle which has not yet been overlapped by a shingle in the next course of shingles). The brackets are positioned such that the next course of tiles will be positioned in such a way (i.e., according to the lateral offset of one-half the width of the tab plus one of the intermediate notches) such that the landing riser 13 and the slot-defining structure riser 15 of the bracket are positioned just below the upper edge 81 of the right hand side notch 82 of a first shingle, just below the upper edge 84 of the left hand side notch of a second shingle, and between the right hand side notch of the first shingle and the left hand side notch of the second shingle.

Figure 4:
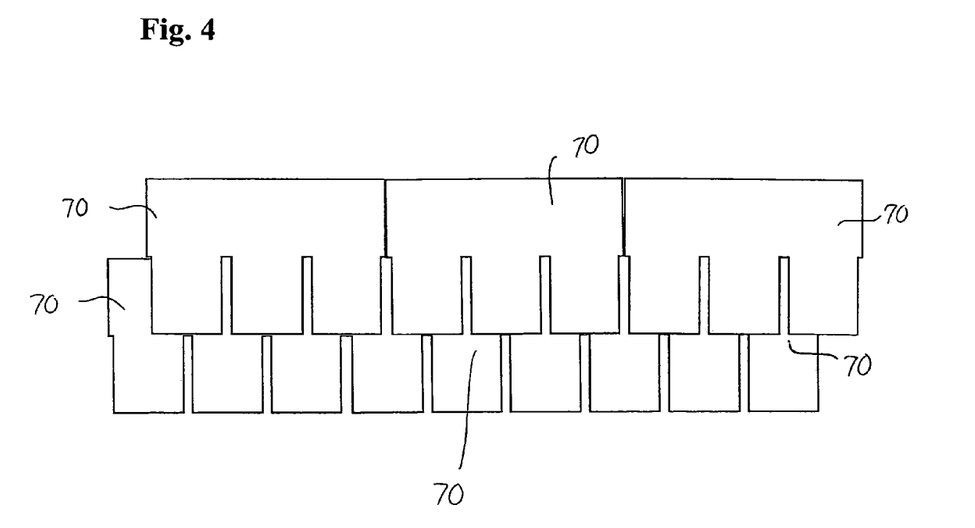
FIGS. 4-7 depict in sequence a portion of a rooftop on which a course of shingles has been installed (FIG. 4 shows portions of two courses), then a bracket is installed (FIG. 5), then a next course of shingles is installed (FIG. 6) and then another course of shingles is installed (FIG. 7).
Figure 5:
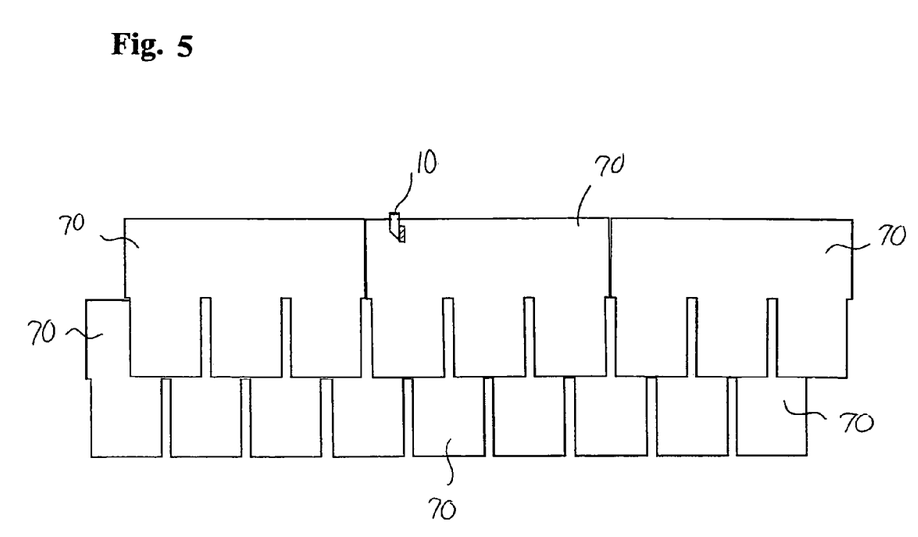
Figure 6:
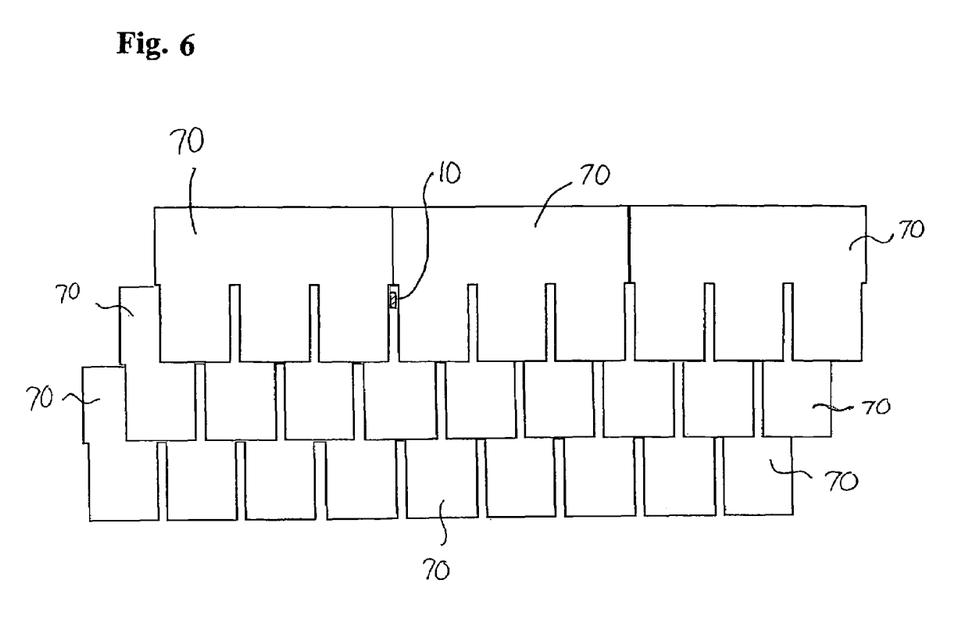
Figure 7:
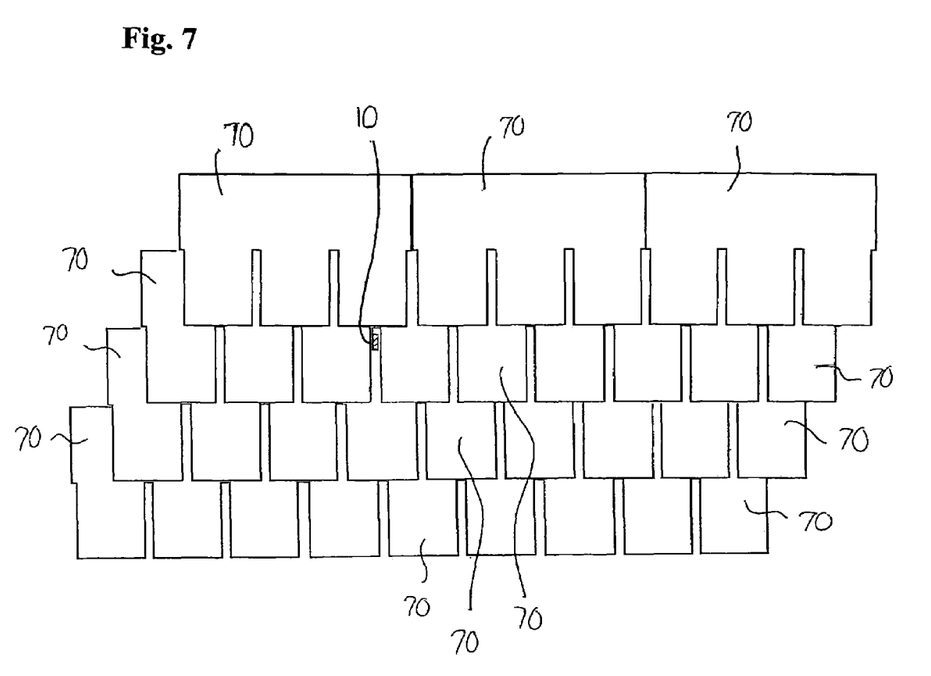

In order to illustrate, FIGS. 4-7 depict a sequence in which a course of shingles has been installed (FIG. 4 shows portions, namely, including only three shingles each, of two courses), then a bracket is installed (FIG. 5), then a next course of shingles is installed (FIG. 6) and then another course of shingles is installed (FIG. 7). Each of FIGS. 5-7 is a sectional view taken parallel to the plane of the roof deck, just slightly above the shingles (whereby the region shown in cross-section is the lowermost portion of the landing riser and the slot-defining structure riser).

In another embodiment, shingles and brackets are mounted on a rooftop structure in the manner described herein, and then rooftop elements are mounted on the brackets in the manner described herein, the rooftop elements covering at least 70 percent (or at least 80 percent, or at least 90 percent, or the substantial entirety) of at least one portion of the rooftop structure.

The present invention provides a low profile mounting bracket which fully retains a complete photovoltaic element and simplifies the installation of the photovoltaic element on any roofing structure, whether sloping or flat, constructed of any standard roofing material. A single low profile mounting bracket provides retention for both the lower end of one photovoltaic element and the upper end of another photovoltaic element.

In accordance with a first aspect of the present invention, there is provided a photovoltaic element installation that is more aesthetically appealing than current conventional photovoltaic installation options. The mounting bracket's slot and land retention design not only facilitates accurate alignment of the photovoltaic elements along the slope of the roof but also assists in maintaining consistent spacing between the photovoltaic elements. Preferably, the width of the photovoltaic element frame (i.e., the dimension in the direction in which the elements in a row (course) are arranged) is a multiple of the width of the roof, so that each photovoltaic element can be mounted so as to provide continuity in an overall pattern of a roof structure which includes the photovoltaic elements, making the installation more aesthetically appealing than conventional photovoltaic installations.

Any structural part of the brackets described herein can be provided in two or more parts (which are held together, if necessary).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A bracket comprising:
a mounting base;
a landing;
a landing riser;
a slot-defining structure; and
a slot-defining structure riser;
said mounting base comprising a first mounting base surface, at least a portion of said first mounting base surface being substantially flat and extending substantially in a first plane,
said landing riser being attached to said mounting base,
said landing being attached to said landing riser,
said landing comprising a first landing surface which extends substantially in a second plane, said second plane being substantially parallel to said first plane,
said slot-defining structure riser being attached to said mounting base,
said slot-defining structure being attached to said slot-defining structure riser,
said slot-defining structure comprising a first slot-defining surface and a second slot-defining surface, a slot being defined between said first slot-defining surface and said second slot-defining surface, said first slot-defining surface extending substantially in a third plane, said third plane being substantially parallel to said first plane,
said second plane and said third plane each being spaced from said first plane,
said slot-defining structure comprising a first slot-defining structure surface and a second slot-defining structure surface, said first slot-defining structure surface extending substantially in a fourth plane, said second slot-defining structure surface extending substantially in a fifth plane, said fifth plane being substantially parallel to said fourth plane,
said slot-defining structure riser comprising a first slot-defining structure riser surface and a second slot-defining structure riser surface, said first slot-defining structure riser surface extending substantially in said fourth plane, said second slot-defining structure riser surface extending substantially in said fifth plane, and
said landing riser comprising a first landing riser surface and a second landing riser surface, said first landing riser surface extending substantially in said fourth plane, said second landing riser surface extending substantially in said fifth plane.

2. A bracket comprising:
a mounting base;
a landing;
a landing riser;
a slot-defining structure; and
a slot-defining structure riser;
said mounting base comprising a first mounting base surface, at least a portion of said first mounting base surface being substantially flat and extending substantially in a first plane,
said landing riser being attached to said mounting base,
said landing being attached to said landing riser,
said landing comprising a first landing surface which extends substantially in a second plane, said second plane being substantially parallel to said first plane,
said slot-defining structure riser being attached to said mounting base,
said slot-defining structure being attached to said slot-defining structure riser.
said slot-defining structure comprising a first slot-defining surface and a second slot-defining surface, a slot being defined between said first slot-defining surface and said second slot-defining surface, said first slot-defining surface extending substantially in a third plane, said third plane being substantially parallel to said first plane,
said second plane and said third plane each being spaced from said first plane,
said landing riser comprising a first landing riser surface and a second landing riser surface, said first landing riser surface extending substantially in a fourth plane, said second landing riser surface extending substantially in a fifth plane, said fifth plane being substantially parallel to said fourth plane, said fourth plane being substantially perpendicular to said first plane.

3. A bracket comprising:
a mounting base;
a landing;
a landing riser;
a slot-defining structure; and a slot-defining structure riser;
said mounting base comprising a first mounting base surface, at least a portion of said first mounting base surface being substantially flat and extending substantially in a first plane,
said landing riser being attached to said mounting base,
said landing being attached to said landing riser,
said landing comprising a first landing surface which extends substantially in a second plane, said second plane being substantially parallel to said first plane,
said slot-defining structure riser being attached to said mounting base,
said slot-defining structure being attached to said slot-defining structure riser,
said slot-defining structure comprising a first slot-defining surface and a second slot-defining surface, a slot being defined between said first slot-defining surface and said second slot-defining surface, said first slot-defining surface extending substantially in a third plane, said third plane being substantially parallel to said first plane,
said second plane and said third plane each being spaced from said first plane,
said mounting holes extending though mounting base from said first mounting base surface to said second mounting base surface, and said mounting holes extend in directions substantially perpendicular to said first planes
said mounting base having a plurality of mounting holes formed therethrough, said mounting holes each having an opening on said first mounting base surface.

4. A bracket comprising:
a mounting base;
a landing;
a landing riser;
a slot-defining structure; and
a slot-defining structure riser;
said mounting base comprising a first mounting base surface, at least a portion of said first mounting base surface being substantially flat and extending substantially in a first plane.
said landing riser being attached to said mounting base,
said landing being attached to said landing riser,
said landing comprising a first landing surface which extends substantially in a second plane, said second plane being substantially parallel to said first plane,
said slot-defining structure riser being attached to said mounting base,
said slot-defining structure being attached to said slot-defining structure riser,
said slot-defining structure comprising a first slot-defining surface and a second slot-defining surface, a slot being defined between said first slot-defining surface and said second slot-defining surface, said first slot-defining surface extending substantially in a third plane, said third plane being substantially parallel to said first plane,
said second plane and said third plane each being spaced from said first plane,
a major axis of said slot extending in a slot-extending direction, a gap being positioned between at least a portion of said landing riser which is spaced from said mounting base and at least a portion of said slot-defining structure riser which is spaced from said mounting base, said gap extending in a direction which is parallel to said slot-extending direction.

5. A bracket as recited in claim 4 wherein said mounting base comprises a second mounting base surface which extends substantially in a sixth plane, said sixth plane being substantially parallel to said first plane.

6. A bracket as recited in claim 4 wherein:
a major axis of said slot extends in a slot-extending direction, and
said slot has an open end and a closed end spaced from each other along said slot-extending direction.

7. A bracket as recited in claim 4, wherein said landing further comprises a second landing surface, said second landing surface extending substantially in a ninth plane, said ninth plane being substantially parallel to said second plane.

8. A method of making a bracket, comprising:
forming a unitary element; and
bending said unitary element to produce a bracket as recited in claim 4.

9. A method as recited in claim 8, wherein:
said slot-defining structure comprises a first slot-defining structure surface and a second slot-defining structure surface, said first slot-defining structure surface extending substantially in a fourth plane, said second slot-defining structure surface extending substantially in a fifth plane, said fifth plane being substantially parallel to said fourth plane,
said slot-defining structure riser comprises a first slot-defining structure riser surface and a second slot-defining structure riser surface, said first slot-defining structure riser surface extending substantially in said fourth plane, said second slot-defining structure riser surface extending substantially in said fifth plane,
said landing riser comprises a first landing riser surface and a second landing riser surface, said first landing riser surface extending substantially in said fourth plane, said second landing riser surface extending substantially in said fifth plane, said fifth plane being substantially parallel to said fourth plane, said fourth plane being substantially perpendicular to said first plane,
said mounting base comprises a second mounting base surface which extends substantially in a sixth plane, said sixth plane being substantially parallel to said first plane, and
said landing further comprises a second landing surface, said second landing surface extending substantially in a ninth plane, said ninth plane being substantially parallel to said second plane.

10. A bracket comprising:
a mounting base;
a landing;
a landing riser;
a slot-defining structure; and
a slot-defining structure riser;
said mounting base comprising a first mounting base surface, at least a portion of said first mounting base surface being substantially flat and extending substantially in a first plane,
said landing riser being attached to said mounting base,
said landing being attached to said landing riser, said landing comprising a first landing surface which extends substantially in a second plane, said second plane being substantially parallel to said first plane,
said slot-defining structure riser being attached to said mounting base,
said slot-defining structure being attached to said slot-defining structure riser.

said slot-defining structure comprising a first slot-defining surface and a second slot-defining surface, a slot being defined between said first slot-defining structure and said second slot-defining surface, said first slot-defining surface extending substantially in a third plane, said third plane being substantially parallel to said first plane, said second plane and said third plane each being spaced from said first plane, a major axis of said slot extending in a slot-extending direction, and said slot-defining structure extending farther in a direction parallel to said slot-extending direction and away from said landing riser than said slot-defining structure riser.

11. A bracket comprising:
a mounting base;
a landing;
a landing riser;
a slot-defining structure; and
a slot-defining structure riser;

said mounting base comprising a first mounting base surface, at least a portion of said first mounting base surface being substantially flat and extending substantially in a first plane, said landing riser being attached to said mounting base,
said landing being attached to said landing riser,
said landing comprising a first landing surface which extends substantially in a second plane, said second plane being substantially parallel to said first plane, said slot-defining structure riser being attached to said mounting base, said slot-defining structure being attached to said slot-defining structure riser, said slot-defining structure comprising a first slot-defining surface and a second slot-defining surface, a slot being defined between said first slot-defining surface and said second slot-defining surface, said first slot-defining surface extending substantially in a third plane, said third plane being substantially parallel to said first plane, said second plane and said third plane each being spaced from said first plane, a major axis of said slot extending in a slot-extending direction, said slot having an open end and a closed end spaced from each other along said slot-extending direction, and said first slot-defining surface extending farther in a direction parallel to said slot-extending direction and away from said closed end than said second slot-defining surface.

12. A bracket comprising:
a mounting base;
a landing;
a landing riser;
a slot-defining structure; and
a slot-defining structure riser;

said mounting base comprising a first mounting base surface, at least a portion of said first mounting base surface being substantially flat and extending substantially in a first plane, said landing riser being attached to said mounting base,
said landing being attached to said landing riser,
said landing comprising a first landing surface which extends substantially in a second plane, said second plane being substantially parallel to said first plane, said slot-defining structure riser being attached to said mounting base, said slot-defining structure being attached to said slot-defining structure riser, said slot-defining structure comprising a first slot-defining surface and a second slot-defining surface, a slot being defined between said first slot-defining surface and said second slot-defining surface, said first slot-defining surface extending substantially in a third plane, said third plane being substantially parallel to said first plane, said second plane and said third plane each being spaced from said first plane.

an overlap structure, said overlap structure comprising a first overlap structure surface, said first overlap structure surface extending substantially in a seventh plane, said seventh plane being substantially parallel to said first plane, said overlap structure comprising an overhang edge, said overhang edge extending substantially in an eighth plane, said eighth plane being substantially perpendicular to said seventh plane.

13. A bracket comprising:
a mounting base;
a landing;
a landing riser;
a slot-defining structure; and
a slot-defining structure riser;

said mounting base comprising a first mounting base surface, at least a portion of said first mounting base surface being substantially flat and extending substantially in a first plane, said landing riser being attached to said mounting base,
said landing being attached to said landing riser,
said landing comprising a first landing surface which extends substantially in a second plane, said second plane being substantially parallel to said first plane, said slot-defining structure riser being attached to said mounting base, said slot-defining structure being attached to said slot-defining structure riser, said slot-defining structure comprising a first slot-defining surface and a second slot-defining surface, a slot being defined between said first slot-defining surface and second slot-defining surface, said first slot-defining surface extending substantially in a third plane, said third plane being substantially parallel to said first plane, said second plane and said third plane each being spaced from said first plane, said slot-defining structure comprising a first slot-defining structure surface and a second slot-defining structure surface, said first slot-defining structure surface extending substantially in a fourth plane, said second slot-defining structure surface extending substantially in a fifth plane, said fifth plane being substantially parallel to said fourth plane, said slot-defining structure riser comprising a first slot-defining structure riser surface and a second slot-defining structure riser surface, said first slot-defining structure riser surface extending substantially in said fourth plane, said second slot-defining structure riser surface extending substantially in said fifth plane, said landing riser comprising a first landing riser surface and a second landing riser surface, said first landing riser surface extending substantially in said fourth plane, said second landing riser surface extending substantially in said fifth plane, said fifth plane being substantially parallel to said fourth plane, said fourth plane being substantially perpendicular to said first plane, said mounting base comprising a second mounting base surface which extends substantially in a sixth plane, said sixth plane being substantially parallel to said first plane, and said landing further comprising a second landing surface, said second landing surface extending substantially in a ninth plane, said ninth plane being substantially parallel to said second plane.

14. A bracket as recited in claim 13, wherein:

a major axis of said slot extends in a slot-extending direction, and said slot-defining structure extends farther in a direction parallel to said slot-extending direction and away from said landing riser than said slot-defining structure riser.

15. A bracket as recited in claim 13, wherein a major axis of said slot extends in a slot-extending direction, and said slot has an open end and a closed end spaced from each other along said slot-extending direction, and said first slot-defining surface extends farther in a direction parallel to said slot-extending direction and away from said closed end than said second slot-defining surface.

16. A method of mounting a rooftop element on a rooftop structure, comprising:

attaching a plurality of brackets to said rooftop structure, at least a first and second of said brackets comprising a bracket comprising:

a mounting base;
a landing;
a landing riser;
a slot-defining structure; and
a slot-defining structure riser;

said mounting base comprising a first mounting base surface, at least a portion of said first mounting base surface being substantially flat and extending substantially in a first plane, said landing riser being attached to said mounting base,
said landing being attached to said landing riser, said landing comprising a first landing surface which extends substantially in a second plane, said second plane being substantially parallel to said first plane, said slot-defining structure riser being attached to said mounting base, said slot-defining structure being attached to said slot-defining structure riser, said slot-defining structure comprising a first slot-defining surface and a second slot-defining surface, a slot being defined between said first slot-defining surface and said second slot-defining surface, said first slot-defining surface extending substantially in a third plane, said third plane being substantially parallel to said first plane, said second plane and said third plane each being spaced from said first plane, positioning a rooftop element on said first and second brackets, said rooftop element comprising at least a first flange and a second flange, said first flange being positioned on said first slot-defining surface of said first bracket, said second flange being positioned on said landing of said second bracket; and sliding said rooftop element relative to said first and second brackets such that said first flange slides along said first slot-defining surface of said first bracket and said second flange slides along said landing of said second bracket to a position where said first flange is positioned in said slot between said first slot-defining surface and said second slot-defining surface of said first bracket and said second flange is still in contact with said landing of said second bracket.

17. A method as recited in claim 16, wherein said rooftop element is a PV module.

18. A rooftop array, comprising:

a rooftop structure;

a plurality of brackets attached to said rooftop structure, each of said brackets comprising a bracket comprising:

a mounting base;
a landing;
a landing riser;
a slot-defining structure; and
a slot-defining structure riser;

said mounting base comprising a first mounting base surface, at least a portion of said first mounting base surface being substantially flat and extending substantially in a first plane, said landing riser being attached to said mounting base,
said landing being attached to said landing riser, said landing comprising a first landing surface which extends substantially in a second plane, said second plane being substantially parallel to said first plane, said slot-defining structure riser being attached to said mounting base, said slot-defining structure being attached to said slot-defining structure riser, said slot-defining structure comprising a first slot-defining surface and a second slot-defining surface, a slot being defined between said first slot-defining surface and said second slot-defining surface, said first slot-defining surface extending substantially in a third plane, said third plane being substantially parallel to said first plane, said second plane and said third plane each being spaced from said first plane, a plurality of rooftop elements, wherein;

each of said rooftop elements is supported by at least two of said brackets, a first of said rooftop elements has at least a first flange and a second flange, said first flange being located on a first slot-defining surface of a first bracket and in a slot of said first bracket, said second flange being positioned on a landing of a second bracket, a second of said rooftop elements has at least a third flange and a fourth flange, said third flange being positioned on a first slot-defining surface of a second bracket and in a slot of said second bracket.

* * * * *